United States Patent
Richards et al.

(10) Patent No.: US 11,528,201 B1
(45) Date of Patent: Dec. 13, 2022

(54) ACTIVE NETWORK MONITORING WITH TELEMETRY-ENRICHED PACKETS

(71) Applicant: Amazon Technologies, Inc., Seattle, WA (US)

(72) Inventors: Steven Bruce Richards, Sammamish, WA (US); David James Goodell, Seattle, WA (US); Nandita Mathews, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 16/904,415

(22) Filed: Jun. 17, 2020

(51) Int. Cl.
*H04L 43/062* (2022.01)
*H04L 47/34* (2022.01)
*H04L 43/50* (2022.01)

(52) U.S. Cl.
CPC ............ *H04L 43/062* (2013.01); *H04L 43/50* (2013.01); *H04L 47/34* (2013.01); *H04L 2212/00* (2013.01)

(58) Field of Classification Search
CPC ....... H04L 43/062; H04L 43/50; H04L 47/34; H04L 2212/00
See application file for complete search history.

(56) References Cited

U.S. PATENT DOCUMENTS

| | | | |
|---|---|---|---|
| 2016/0099853 A1* | 4/2016 | Nedeltchev | H04L 43/0888 370/253 |
| 2020/0296007 A1* | 9/2020 | Finn, II | H04L 41/145 |
| 2021/0306246 A1* | 9/2021 | Jacob Da Silva | H04L 41/0816 |

* cited by examiner

*Primary Examiner* — Jianye Wu
(74) *Attorney, Agent, or Firm* — Knobbe, Martens, Olson & Bear, LLP

(57) ABSTRACT

Features are disclosed for enriching a packet of network traffic between a first computing environment and a second computing environment with telemetry information. Each computing environment can include a network device for enriching packets with telemetry information and parsing enriched packets. A source network device can select a packet of the network traffic for enrichment based on enrichment parameters and generate an enriched packet including payload information and telemetry information. A destination network device can receive the enriched packet and parse the enriched packet to separate the payload information and telemetry information. The destination network device can transmit transmission information to the source network device based on the enriched packet.

23 Claims, 6 Drawing Sheets

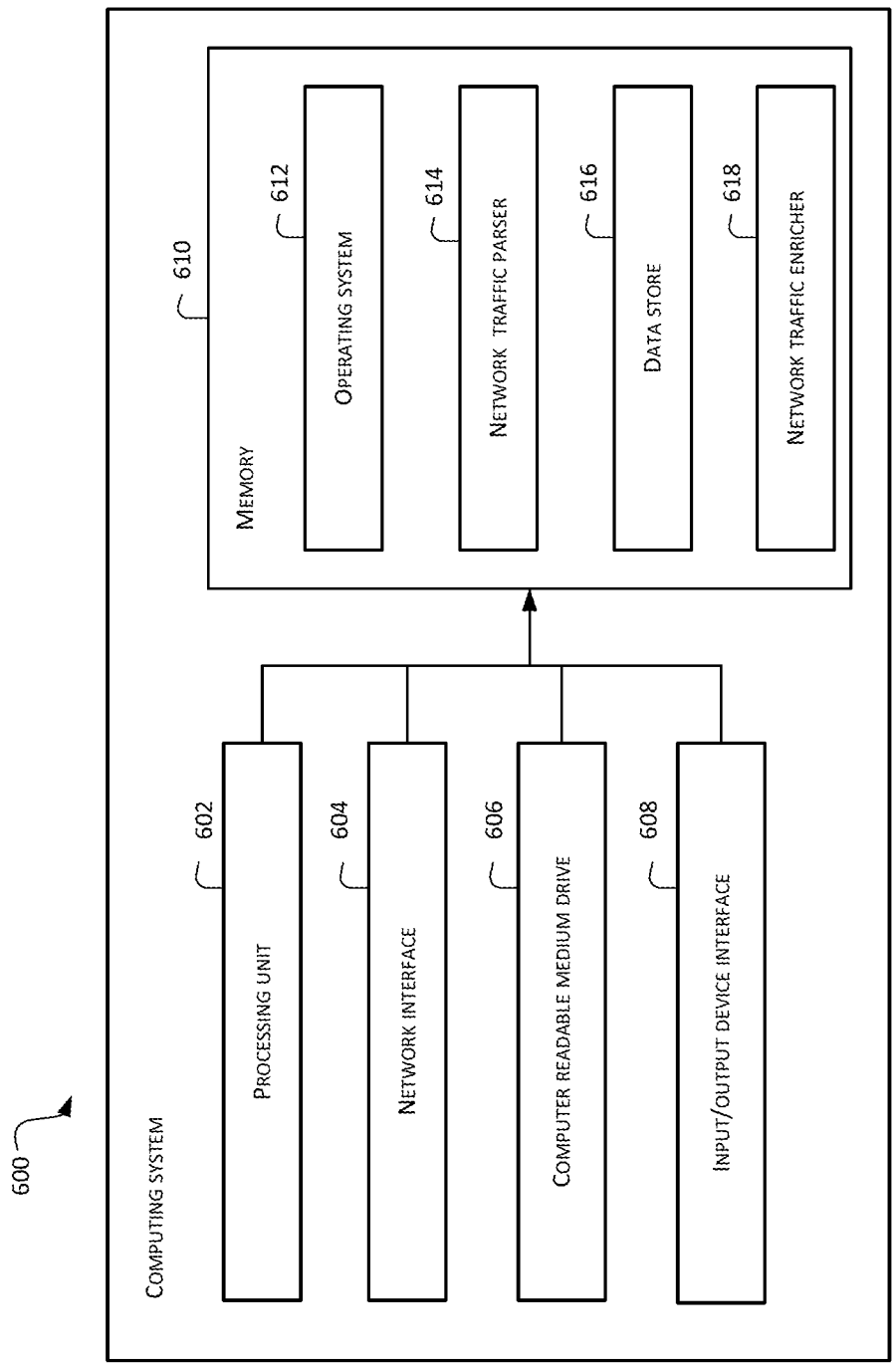

ACTIVE NETWORK MONITORING WITH
TELEMETRY-ENRICHED PACKETS

BACKGROUND

Networks are a ubiquitous part of the modern world and people use networks to facilitate communications between multiple systems. Networks are physically present to distribute packets (e.g., items) from a first location to a second location. Packets are small amounts of data that are passed among network locations. Packets, once received by a destination location, can be grouped into a larger amounts of data or otherwise parsed to determine information associated with the packet. Packets can correspond to communications between network locations. Over the course of communications between a first location and a second location, packets may be lost or delayed before reaching the destination location. Lost or delayed packets can adversely affect a source or destination location as the relevant location may not receive required information. Further, the source location may be incapable of recognizing that packets have been lost or delayed in transmission. It can be advantageous to capture the number of packets lost during transmission and/or the delay in the transmission of the packets in order to provide customers with network traffic statistics. Further, the network traffic statistics may indicate to a customer whether changes should be made to a network configuration (e.g., discontinuing communications with a network location). To ensure that packet loss and latency is accurately captured, many networks include network monitoring systems that can predict data loss and data latency at network locations. The accuracy of the packet loss and latency measurements may differ based on how packet loss and latency are defined, where the measurements occur, and how the measurements are conveyed to a customer.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 6 shows an example computing device that may be used to implement aspects of the present disclosure.

DETAILED DESCRIPTION

Figure 1:
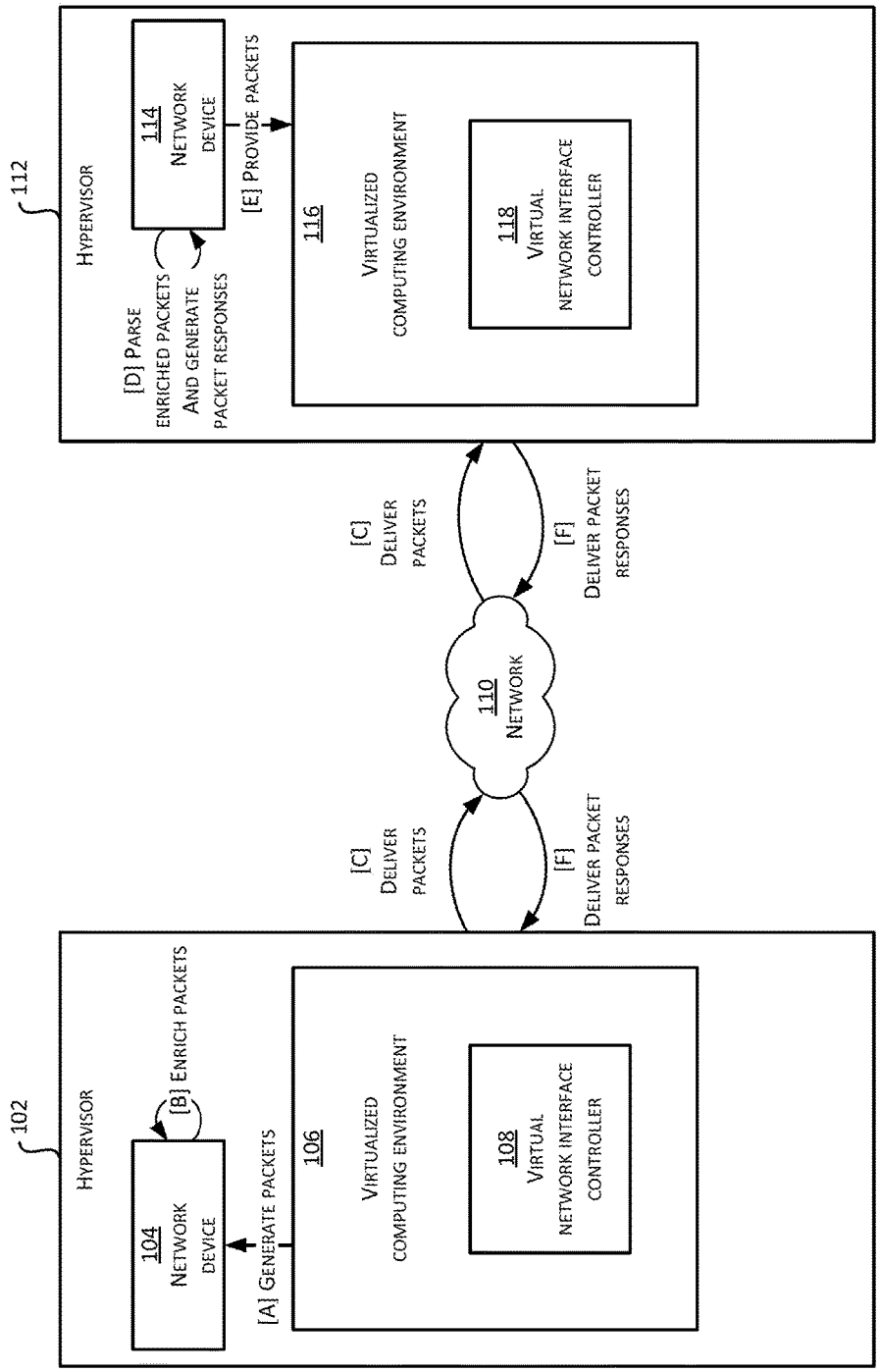
FIG. 1 depicts a schematic diagram of a network including a source and a destination in accordance with aspects of the present disclosure.

The present disclosure generally relates to monitoring active network traffic from a network source (e.g., a node) to a network destination (e.g., another location such as another node or an end-user). To ensure accuracy while monitoring the active network traffic, a packet of the active network traffic is enriched with telemetry information and sent to the destination location. By enriching active network traffic, the system can determine active network traffic conditions and statistics. A network device may monitor network traffic between a plurality of network locations in order to enrich packets of the network traffic in order to provide network monitoring without requiring input from the network source or source computing environment. The network device may identify when network traffic has been adversely affected such as when a data loss or a transmission delay has occurred based on communications with a network device at the destination location and the telemetry information. The network traffic may further be monitored according to round-trip time (e.g., the time that it takes to send a packet to a location and receive a response), response information (e.g., the response rate of a given location), or other network traffic information. After monitoring the network traffic, the network device may provide network traffic statistics to an end-user or customer to provide a representation of the network traffic statistics. This allows the end-user to modify the network locations associated with the network traffic based on the network traffic statistics collected with the network device. For example, the network monitoring service may determine that network traffic between a network source and a network destination has been significantly delayed and the network traffic may be subsequently modified (e.g., discontinuing the network traffic between the network source and the network destination).

In many cases, implementing a general network monitoring service on network traffic may not provide satisfactory results in particular circumstances or for particular users (e.g., some network traffic may be recognized as false positives or false negatives). For example, one way a network monitoring service may monitor network traffic is by passively monitoring network traffic. The passive monitoring of the network traffic can involve observing traffic and denoting when a loss is believed to have occurred. The passive nature of the monitoring means that it can be difficult to accurately measure network traffic statistics as the network monitoring service does not test the network and only monitors client or network location behavior. Another way a network monitoring service may monitor network traffic is by actively monitoring network traffic. The active monitoring of the network traffic can involve sending discrete probes to a network location to determine network traffic statistics associated with the probe where the probe is not associated with actual network traffic. The active nature of the probe means that the network monitoring service is not monitoring actual traffic between the network locations and the network traffic statistics may not be indicative of actual network traffic.

Generally described, aspects of the present disclosure relate to developing a method for determining network-related statistics (e.g., transmission rate, transmission loss) associated with network traffic between a network source and a network destination. Such network-related issues may correspond to issues in communication of an item (e.g., a packet) from a network source to a destination. Issues in communication of a packet may include packet loss or latency as a packet that is sent from a network source to a network destination may be delayed or lost in transmission or delivery. When packet loss or latency occurs, the network source or network destination may be incapable of determining such an issue occurred. For example, the network source may transmit a packet to a destination and may be incapable of determining that the packet was received by the destination or lost during transmission. Therefore, it can be advantageous to indicate to the network source and/or the network destination that such a packet was lost and/or delayed. For example, a device (e.g., a network device) may provide an indication of the level of packet loss or latency associated with the network traffic. This information may be valuable to one or more entities associated with the network such as a customer associated with the network source or network destination. For instance, a customer may be running a virtualized computing environment at the network source and may be sending packets of information over the network to another customer running a virtualized computing environment at the network destination. Each customer may be a customer of the network in that they are using the network resources to pass information between a network source and location. Additionally, each customer may be considered a customer in that they are using network resources to provision or run a virtualized computing environment. Providers of conventional networks may be incapable of providing customers with heightened insights into the network traffic being generated by the customers and the health of the corresponding network resources. Therefore, in providing the network resources to the customer, it may be beneficial for the network provider to provide higher levels of network-related statistics such as packet loss or latency that enable the customer to more effectively use the network resources. Providing such an indication of packet loss or latency beneficially provides a customer with an indication of what network sources and/or destinations may exhibit a higher level of packet loss or latency. Further, the packet loss or latency indications may allow a network source and/or destination to isolate network components that are the source of packet loss or latency.

Embodiments of the present disclosure enable a more accurate and less complex method of determining packet loss or latency associated with network traffic by enriching a previously generated packet of network traffic being transmitted from a network source to a network destination with telemetry information. The telemetry information can then be used to determine packet loss, packet latency, or other network traffic statistics. Packet loss may be measured as packets which were dropped by a device at the network destination or not received by the network destination. Packet latency may be measured as packets which were not received by a network destination within a certain threshold time period. More specifically, embodiments of the present disclosure can provide a more accurate and less intrusive method for determining packet loss and latency by monitoring active network traffic and passively enriching (e.g., encapsulating) a packet of the active network traffic with telemetry information.

As noted above, a packet of active network traffic between a network source and a network destination can be encapsulated with telemetry information to generate a telemetry-enriched packet. For example, the payload information of the packet may be combined with the telemetry information to form a telemetry-enriched packet. In some embodiments, the packet can further correspond to active network traffic between a source virtualized computing environment and a destination virtualized computing environment. The packet may be generated by the source virtualized computing environment to be delivered to the destination virtualized computing environment corresponding to the active network traffic or a portion of the active network traffic between the virtualized computing environments. Each virtualized computing environment may further include a network interface controller for communicating the packet, after generation by the source virtualized computing environment, to the network for delivery to the destination virtualized computing environment. The packet may include a payload (e.g., base information to be sent from the source to the destination) and initial encapsulation information (e.g., a header). For example, the packet may include megabytes, gigabytes, petabytes, etc. of data corresponding to information to be delivered to the destination. The packet may be one of a group of packets that are delivered between the source and destination corresponding to active network traffic over a period of time. Prior to a delivery of the packet to the destination by the network controller, the packet may be selected or intercepted by a network device associated with the source. In other embodiments, the packet can correspond to a physical item that is to be delivered from a first physical location to a second physical location. The physical item may be intercepted by a network component (e.g., a network distributor, a shipping distributor, a delivery service). The packet may include information indicating that it is being transmitted from the source to the destination.

Prior to being transmitted from the source to the destination, the network device associated with the source can intercept intermittent packets of the active network traffic for telemetry enrichment. The network device may identify enrichment parameters identifying parameters for enrichment of packets of the active network traffic between a particular source and a particular destination. For example, the enrichment parameters may indicate that every packet should be intercepted or every $10^{th}$, $100^{th}$, or $1000^{th}$ packet should be intercepted or that a packet should be intercepted every 5 ms, 20 ms, or 100 ms. Further, the network device may intercept one out of every ten packets of active network traffic between a source and destination for telemetry enrichment. The telemetry enrichment of the packet may involve wrapping the payload (e.g., base packet information) in telemetry information as part of an encapsulation process. The payload information may be retained in its original format prior to, during, and after the telemetry enrichment and the payload information may subsequently be separated from the telemetry information. For example, the telemetry enrichment of the packet may not alter the payload information. The telemetry information may include information indicating that the telemetry-enriched packet is a telemetry-enriched packet. For example, the telemetry information may include one or more flags, headers, or identifiers that a network device may recognize as indicating that a corresponding packet has been enriched with telemetry information. Further, the telemetry information may include generation information, timing information, sequence number information, etc. For example, a telemetry-enriched packet may include telemetry information indicating that the packet has been telemetry-enriched and further identify the timing of the generation of the telemetry-enriched packet and/or a sequence number (e.g., a generation number). A sequence number may be any sequence (e.g., string) of numbers and/or letters associated with a distinct telemetry-enriched packet. The network device may associate each telemetry-enriched packet with a sequence number and any new telemetry-enriched packet may be associated with a new sequence number (e.g., higher than a previous number). The sequence number may be used by network devices to associate a particular telemetry-enriched packet with a particular response. Further, the telemetry-enriched packet may be enriched with information indicating that a response to the telemetry-enriched packet is required. For example, the telemetry-enriched packet may include a flag, header, or identifier indicating that the destination is required to send a response to the telemetry-enriched packet. The telemetry-enriched packet can further include information indicating that it is being transmitted from a source network device to a destination network device.

Further aspects of the present disclosure relate to a network device associated with the destination that can receive packets associated with the active network traffic between a source and destination. In accordance with the present disclosure, the destination network device may receive a telemetry-enriched packet from the source network device. The destination network device may detect that the telemetry-enriched packet has been telemetry-enriched based on a header, identifier, or flag of the telemetry-network device. Based on determining that the packet has been enriched with telemetry information, the destination network device may parse the telemetry-enriched packet to identify telemetry information including a sequence number and/or timing information. The destination network device may further parse the telemetry-enriched packet to identify the payload and transmit the payload to the network destination. The destination network device may determine a local round-trip time where the local round-trip time indicates a length of time from receipt of the telemetry-enriched packet by the destination network device and receipt of the corresponding packet by the destination virtualized computing environment. The local round-trip time may be determined by sending a probe to the destination virtualized computing environment.

The destination network device may subsequently transmit the sequence number, the local round-trip time, and/or flow information (e.g., flow data, flow identifier, etc.) associated with the active network traffic. The flow information may include one or more indicators of a source IP address, a destination IP address, a source TCP port, a destination TCP port, or other information associated with a flow of network traffic (e.g., the network traffic associated with a source and destination). The sequence number, the local round-trip time, and/or flow information may be packaged in a packet by the destination network device to be delivered from the destination network device to the source network device. The destination network device may transmit the packet to the source network device. The packet may be sent to the source network device separate from any customer traffic. In some embodiments, the destination network device may intercept a packet of active network traffic between the destination and the source, and enrich the packet with the sequence number, the local round-trip time, and/or flow information. In other embodiments, the packet generated by the destination network device may not be associated with or correspond to active network traffic from the destination to the source.

The source network device may receive the response from the destination network device corresponding to transmission information associated with a previous packet. The source network device may identify that the response is associated with a previous telemetry-enriched packet based on a flag, identifier, or header included in the response. The source network device may further parse the response to determine transmission information including a sequence number, the local round-trip time, and/or flow information. Based on receiving the transmission information, the destination network device may further determine a round-trip time. The round-trip time may be based on the time that the source network device transmitted the telemetry-enriched packet and the time that the source network device received corresponding transmission information. For example, if the source network device transmitted the telemetry-enriched packet at 1 ms and received corresponding transmission information at 10 ms, the round-trip time may be 10 ms-1 ms or 9 ms. The source network device may further determine, based at least in part on the transmission information, that a telemetry-enriched packet corresponding to a sequence number of the transmission information has received a response. For example, the source network device may parse the transmission information for a sequence number such as "00120" and determine that a previously generated telemetry-enriched packet is associated with the sequence number "00120" by analyzing a series of sequence numbers stored by the source network device. The source network device may then compare flow information from the transmission information with flow information stored by the source network device to determine if a data loss has occurred in the flow of network traffic. In other embodiments, the source network device may parse the transmission information for flow information and determine that a previously generated telemetry-enriched packet is associated with the same flow information by analyzing a data store associated with the source network device. The source network device may then compare sequence numbers of the telemetry-enriched packets to determine if a loss of data has occurred. Based on this determination, the source network device may determine whether the corresponding transmission of the telemetry-enriched packet was successful. For example, the source network device may determine that the transmission of the telemetry-enriched packet was successful because the sequence number of the transmission information is associated with the sequence number of a previously generated telemetry-enriched packet. Further, the source network device may determine that the transmission was successful based on a previous round-trip time. For example, if the response is received within a time period corresponding to a previous round-trip time, the source network device may determine that the transmission was successful. The source network device may also determine that a corresponding transmission of the telemetry-enriched packet was unsuccessful based on the transmission information. The source network device may further log network traffic information (e.g., the transmission information, data loss information, data transmission information, data dropped information) to a host server (e.g., a monitoring service, a telemetry service, a service host) configured to gather transmission information associated with active network traffic.

FIG. 1 illustrates an example environment 100 in which a network monitoring service may be implemented according to some embodiments. The environment 100 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The cloud provider network may implement an application programming interface (API) as an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

A cloud-provider network may include one or more hypervisors 102, 112 for monitoring and running virtualized computing environments 106, 112. Each of the hypervisor 102 and the hypervisor 112 may be in communication over a network 110. The hypervisors 102, 112 may send packets corresponding to network traffic over the network 110. Each hypervisor 102, 112 may send and deliver packets over the network 110.

The cloud provider network can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be logically isolated from the rest of the cloud provider network, for example it may not be possible to route from a substrate network address to an address in a production network that runs services of the cloud provider, or to a customer network that hosts customer resources.

The cloud provider network can also include an overlay network of virtualized computing resources (e.g., compute instances, block store volumes, data objects such as snapshots and machine images, file storage, databases) that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between a network source and network destination on the network substrate via overlay network paths or routes. The network source and network destination may be associated with a flow of network traffic. The encapsulation protocol technology may be viewed as providing a virtual network topology overlaid on the network substrate. As such, network packets can be routed along the substrate network according to constructs in the overlay network (e.g., VPCs, security groups). A mapping service can coordinate the encapsulation and routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtualized computing environments on the host. A hypervisor, or virtualized computing environment monitor, on a host allocates the host's hardware resources amongst various virtualized computing environments on the host and monitors the execution of the virtualized computing environments. Each virtualized computing environment may be provided with one or more IP addresses in the overlay network, and the virtualized computing environment monitor on a host may be aware of the IP addresses of the virtualized computing environments on the host. A network device in communication with the virtualized computing environment monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints (e.g., a network source and a network destination) on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints A hypervisor 102 may include a virtualized computing environment 106 (e.g., a computing environment, a node, a virtual machine), which may generate a packet (e.g., item, collection of data) to be delivered to a different virtualized computing environment 116 (e.g., a computing environment, a node, a virtual machine), corresponding to network traffic between the virtualized computing environments. The network traffic may be generated by a customer running the virtualized computing environment at the network source. The customer may be sending packets of information over the network to another customer running a virtualized computing environment at the network destination. The customer may send packets over the network (e.g., network traffic) to send data or other information to a network destination. When sending these packets, it may be advantageous for the customer to know that the packet was received by the network destination in order to know what network sources and/or destinations may exhibit a higher level of packet loss or latency and modify the network accordingly. Therefore, the virtualized computing environment 106 may include a virtual network interface controller 108 that connects the virtualized computing environment 106 to a network for transmitting packets over the network. The packets may include payload information to be sent between the virtualized computing environments.

The hypervisor 102 may further include a network device 104 to select packets of network traffic generated by the virtualized computing environment 106 for telemetry enrichment. The network device 104 may be a physical hardware device that routes (e.g., passes) network traffic to a destination location. The network device 104 may include software designed to route the network traffic according to a schedule (e.g., enrichment parameters, encapsulation schedule, etc.). The network device 104 may further intercept packets of network traffic generated by multiple virtualized computing environments. The network device 104 may separately handle network traffic corresponding to each virtualized computing environment and may perform unique or distinct functions for network traffic corresponding to each virtualized computing environment. In some embodiments, each virtualized computing environment may correspond to a unique network device. The network device 104 may monitor all network traffic associated with the hypervisor and selects packets of the network traffic for encapsulation. The packets of network traffic may be generated by a customer of the cloud provider network and may correspond to a flow of data between customers. The network device 104 may encapsulate selected packets with data prior to transmission to a network destination. The network device 104 may select a subset of the packets selected for encapsulation and include enrichment information in the encapsulation. In enriching packets, the network device 104 may intercept (e.g., select) one or more packets of the network traffic being encapsulated and enrich the one or more packets with telemetry information to be sent with the payload information. The network device 104 may enrich network traffic corresponding to different virtualized computing environments at different rates and/or times.

A hypervisor 112 may also include a network device 114 and a virtualized computing environment 116 where the network device 116 is in communication with the virtualized computing environment 116 and configured to receive packets of network traffic over the network 110 and transmit them to the virtualized computing environment 116. The network device 114 may intercept one or more packets transmitted by a virtualized computing environment 106 over the network 110 based on the packet including telemetry information. The network device 114 may receive a packet, parse the packet to separate telemetry information and payload information, and generate a response to the telemetry information. The virtualized computing environment 116 may be the destination of the network traffic and the virtualized computing environment 116 may also include a virtual network interface controller 118. The virtual network interface controller 118 may receive the payload information from the network device 114. The virtualized computing environment 116 may further receive the payload information from the virtual network interface controller 118.

At [A], the virtualized computing environment 106 can generate packets of data corresponding to network traffic between the virtualized computing environment 106 and the virtualized computing environment 116. The virtualized computing environment 106 can generate a packet of data based upon current or prior communications with the virtualized computing environment 116. For example, generating the packet of data may be based on a request by the virtualized computing environment 116. The virtualized computing environment 106 can send the packets of data to a virtual network interface controller 108 configured to send the packets of data over the network to the virtualized computing environment 116. The virtual network interface controller 108 can perform one or more operations to prepare the packet of data to be sent over the network. In transmitting the packets over the network, the network interface controller 108 can send the packets to a network device 104 prior to sending the packets to the network 110. The network device 104 may receive the packets based on an API of the virtualized computing environment 106. The packet of data can include internet protocol ("IP") information indicating that the packet is to be sent from the virtualized computing environment 106 to the virtualized computing environment 116.

At [B], the network device 104 may be configured to perform encapsulation of packets. The network device 104 may further be configured to encapsulate each packet received corresponding to the network traffic. For example, the network device 104 may encapsulate each packet the network device 104 receives by packaging (e.g., encapsulating, combining, packing, etc.) the packet with a corresponding header. In some embodiments, the network device 104 may only encapsulate a portion of the packets it receives. For example, the network device 104 may only encapsulate half of the packets that the network device 104 receives or intercepts. During the encapsulation process, the network device 104 can also receive the packets and select one or more packets for enrichment. For example, the network device 104 may receive 100 packets over 25 ms and the network device 104 may encapsulate each of the 100 packets, further, the network device may choose to enrich a portion (e.g., 25) of the 100 packets with telemetry information. The network device 104 can be configured to select all or a portion of the packets to be encapsulated for enrichment. In some embodiments, the network device 104 may obtain or identify one or more enrichment parameters indicating parameters for selecting packets for enrichment.

The one or more enrichment parameters may include an enrichment rate, an enrichment time period, an enrichment number, or other enrichment parameters. For example, the one or more enrichment parameters may include a parameter that a packet should be selected for enrichment every 5 ms or that every $10^{th}$ packet received by the network device 104 should be selected for enrichment. The one or more enrichment parameters may be provided by a user of the system or a component of the system. For example, the user may indicate that they would like one packet every 10 ms to be enriched with telemetry information. Further, the system may decide that one packet every 3 ms should be enriched with telemetry information based on previous enrichment data, previous network traffic statistics, etc. Based on the one or more enrichment parameters, the network device 104 may include enrichment information in the encapsulation of a packet. For example, as will be explained in greater detail below, an encapsulated packet may include a header with IP information, transmission control protocol ("TCP") information, payload information, and other encapsulation information. The network device 104 may further modify the IP information so that the encapsulated packet indicates that the packet is to be sent from the network device 104 to a network device corresponding to the destination virtualized computing environment. For example, in the example of FIG. 1, the network device 104 may modify the IP information to indicate that the packet is to be sent from the network device 104 to the network device 114. The original IP information may further be included in the encapsulated packet. The network device 104 may further add enrichment information to the header. For example, the header of the encapsulated packet may include IP information, TCP information, enrichment information, payload information, and other encapsulation information. The enrichment information may include one or more of a flag indicating that the packet has been enriched with telemetry information, a sequence number, or timing information.

At [C], the hypervisor 102 via the network device 104 may transmit the packets, all or a portion of which may be encapsulated and all or a portion of which may include telemetry information, via the network 110 to the hypervisor 112. The packets may be delivered intermittently over a period of time to the network 110 and may include one or more enriched packets. Each of the packets may include IP information indicating that the corresponding packet is to be sent to be the hypervisor 112. In some embodiments, one or more of the packets may be delivered to separate hypervisors, computing environments, nodes, etc.

At [D], the hypervisor 112 receives the packets and passes the packets to a network device 114 associated with the hypervisor 112. The network device 114 may receive the packets based on an API of the virtualized computing environment 106. The network device 114 can receive the packets and determine that the packets have been encapsulated. The network device 114 may determine that the packets have been encapsulated based at least in part on the encapsulation header or the information included in the encapsulated packet. Upon determining that a given packet has been encapsulated, the network device may remove the encapsulation header via a decapsulation process. For example, the decapsulation process may include removing the encapsulation headers from the original packet. Further, the decapsulation process may include accessing, reading, or otherwise obtaining the payload information. Upon determining that a given packet has been encapsulated, the network device 114 may further determine whether the encapsulated packet has been enriched with telemetry information. The network device 114 may determine that a given packet has been enriched with telemetry information based at least in part on the encapsulation header. For example, the encapsulation header may include an enrichment information field including a telemetry flag indicating that the packet has been enriched with telemetry information. In other examples, the packet may include a flag, identifier, or other indication that the encapsulated packet has been enriched with telemetry information.

Upon determining that a given telemetry-enriched packet of the packets of network traffic has been enriched, the network device 114 may parse the telemetry-enriched packets. Parsing the telemetry-enriched packets may include separating the payload information from the telemetry information. For example, parsing the telemetry-enriched packets may include removing the telemetry information from the encapsulation header and decapsulating the telemetry-enriched packets to obtain the payload information. The network device 114 may include multiple layers (e.g., a physical layer, a datalink layer, a network layer, a transport layer, a session layer, a presentation layer, and/or an application layer) for decapsulating the telemetry-enriched packets. For example, a network layer may remove an IP header, a transport layer may remove a TCP header, and a third layer may remove the telemetry information. The telemetry information may further indicate that a response by the network device 114 to the network device 104 is required. In some embodiments, the network device 114 may be configured to provide a response to each telemetry-enriched packet and the telemetry-enriched packet may not include a flag indicating that a response is required. The network device 114 may generate a packet response based upon determining that a response is required to the telemetry-enriched packet. The packet response may include a sequence number, timing information, flow information, or other transmission information. For example, the telemetry-enriched packet may include the sequence number "00124" and the response to the telemetry-enriched packet may also include the sequence number "00124" indicating that the response and the telemetry-enriched packet correspond to one another. In some embodiments, the response may logically increment the sequence number included in the telemetry information of the enriched packets. For example, the enriched packets may include a first sequence number "0001" and the response may include a logically incremented second sequence number "0002." In other embodiments, the sequence number may be any number (e.g., a logically decremented number). The network device 114 may further determine a local round-trip time of the packet by sending a probe to the virtualized computing environment 116 and determining when the probe is received by the virtualized computing environment and comparing the receipt of the probe with timing information of the enriched packet. The local round-trip time may be included in the response.

At [E], the network device 114 can parse the telemetry-enriched packets and determine that the original destination of the packet prior to enrichment and/or encapsulation was the virtualized computing environment 116 based upon the encapsulation header or information otherwise encapsulated in the packet. In some embodiments, the determination of the original destination may be based upon IP information included in the packet. The network device 114 can provide the packets to the virtual network interface controller 118 of the virtualized computing environment 116. In some embodiments, the network device 114 may provide the payload information to the virtual network interface controller 118. The virtual network interface controller 118 can be configured to receive packets of data corresponding to the network and provide the packets to the virtualized computing environment. The virtual network interface controller 118 can provide the packet to the virtualized computing environment 116 for further processing. The virtualized computing environment 116 may process the packet of data and generate a packet of data in response to be sent from the virtualized computing environment 116 to the virtualized computing environment 106. Packets of data can be sent back and forth between the virtualized computing environments as active network traffic.

At [F], the hypervisor 112 via the network device 114 may deliver the packet responses to the network 110 and subsequently deliver the packet responses to the hypervisor 102. The packet responses may be configured as encapsulated and/or telemetry-enriched packets by the network device 114. In some embodiments, the packet responses may be delivered to the hypervisor 102 prior to the network device 114 providing the packets (e.g., payload information) to the virtual network interface controller 118 and virtualized computing environment 116. The packet responses may be delivered intermittently after generation by the network device 114. Each of the packet responses may include a sequence number, timing information, flow information, or other transmission information. The network device 104 of the hypervisor 102 may receive the packet responses and generate network traffic statistics based on the packet responses. The network device 104 may determine a round-trip time of the packet based on the transmission information and the time that the packet was sent by the network device 104. The network device 104 may update a round-trip time previously determined with respect to a previously sent telemetry-enriched packet. The network device 104 may further log network traffic information corresponding to the given packet to a host server.

In some instances, the network device 114 may not send the payload information to the virtual network interface controller 118. For example, the network device 114 may determine that the telemetry-enriched packet should be dropped due to a firewall associated with the network device 114, rate limiting, or for any other reason. The network device 114 may subsequently send a packet response to the network device 104 indicating that the telemetry-enriched packet was received by the network device but it was intentionally dropped and the reason for the intentional dropping by the network device 114. The network device 104 may further determine a round-trip time based on the packet response In some instances, the network device 104 may subsequently send another telemetry-enriched packet to the network device 114. The network device 104 may determine that a loss of data has occurred based upon not receiving a response to the subsequent telemetry-enriched packet within a certain time limit based upon the previously determined round-trip time. For example, the network device 104 may determine that a loss of data has occurred when the network device 104 has not received a packet response from the network device 114 within a time-out period based at least in part on the previously determined round-trip time. For example, the network device 104 may determine that a time-out period has elapsed without a response based on a time equal to double the round-trip time, triple the round-trip time, or any other time period. The network device 104 may further log the data loss occurrence to the host server as network traffic information. Further, in some instances, the network device 104 may subsequently receive the telemetry-enriched packet after the time period and the network device 104 may update the host server. For example, the network device 104 may indicate that the telemetry-enriched packet was delayed in transmission and/or a data loss has not occurred. In some embodiments, the round-trip time may be used to determine when data loss has occurred with respect to an encapsulated packet that does not include telemetry information.

Figure 2:
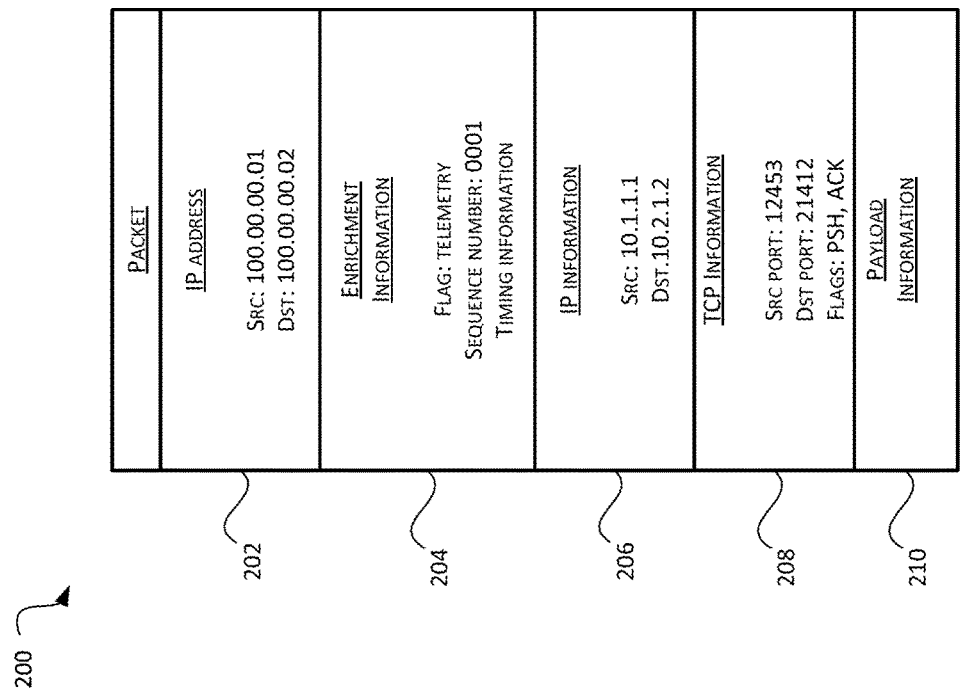
FIG. 2 is a pictorial diagram depicting a telemetry-enriched packet in accordance with aspects of the present disclosure.

FIG. 2 illustrates a pictorial diagram depicting a telemetry-enriched packet 200 in accordance with aspects of the present disclosure. The telemetry-enriched packet 200 may correspond to a packet of active network traffic between a network source and a network destination that has been enriched with telemetry information. The telemetry-enriched packet 200 may be encapsulated with telemetry information. Further, the telemetry-enriched packet 200 may also be encapsulated with other information. For example, the telemetry-enriched packet 200 may be divided into multiple layers, portions, headers, or sections such as an IP address layer 202, an enrichment information layer 204, an IP information layer 206, a TCP information layer 208, and a payload information layer 210. One or more layers of the telemetry-enriched packet may correspond to control data and one or more layers of the telemetry-enriched packet may correspond to user data. In other embodiments, the telemetry-enriched packet 200 may include additional fields or layers such as a user datagram protocol layer, an Ethernet layer, or a trivial file transfer protocol layer. One or more layers of the telemetry-enriched packet may correspond to layers of the packet such as the IP information layer 206, TCP information layer 208, and the payload information layer 210. In some embodiments, more or less layers of the telemetry-enriched packet may correspond to layers of the packet. One or more layers of the telemetry-enriched packet may correspond to layers added via the encapsulation process such as the IP address layer 202 and the enrichment information layer 204. In some embodiments, more or less layers of the telemetry-enriched packet may correspond to layers added via the encapsulation of the packet.

The telemetry-enriched packet may include an IP address layer 202. The IP address layer 202 may be added during the encapsulation of the packet. In some embodiments, the IP address layer may be added to every packet that is encapsulated. The IP address layer 202 may include a source IP address and a destination IP address. The IP address layer 202 may provide a new destination IP address for the telemetry-enriched packet. For example, the telemetry-enriched packet may correspond to network traffic between a first virtualized computing environment and a second virtualized computing environment and the original IP information may indicate that the first virtualized computing environment corresponds to a source IP address and the second virtualized computing environment corresponds to a destination IP address. During the encapsulation process, a first network device corresponding to the first virtualized computing environment may generate an updated source IP address corresponding to the first network device. Further, the first network device may generate an updated destination IP address corresponding to a second network device corresponding to the second virtualized computing environment. Therefore, the IP address layer 202 may correspond to a source IP address corresponding to a network device associated with the original source virtualized computing environment and a destination IP address corresponding to a network device associated with the original destination virtualized computing environment. The IP address layer 202 may correspond to an actual source and destination of the telemetry-enriched packet. For example, the source and destination IP addresses of the IP address layer 202 may indicate that the telemetry-enriched is being transmitted from the source IP address (e.g., the first network device) to the destination IP address (e.g., the second network device).

The telemetry-enriched packet may include an enrichment information layer 204. The enrichment information layer 204 may be added during the encapsulation of the packet by the source network device. In some embodiments, one or more encapsulated packets may not include the enrichment information layer 204. The enrichment information layer 204 may include one or more fields of telemetry information. The one or more fields of telemetry information may include one or more of a telemetry flag, a sequence number, timing information, or other telemetry information. The telemetry flag may be a flag, identifier, tag, word string, or other indication that the telemetry-enriched packet has been enriched with telemetry information. The destination network device may receive a packet and determine the packet has been enriched with telemetry information based on the telemetry flag. The telemetry flag may correspond to a logical high (e.g., a "1") or a logical low (e.g., a "0"). In some embodiments, the telemetry flag may correspond to a word string such as "telemetry-enriched" indicating that the packet has been enriched with telemetry information. The sequence number may be a number, ID, or other data string associated with the telemetry-enriched packet. The sequence number may be generated by the source network device and may correspond to the specific telemetry-enriched packet. For example, the sequence number may correspond to the timing of the telemetry-enriched packet (e.g., a first telemetry-enriched packet may include a sequence number "0001," a second telemetry-enriched packet may include a sequence number "0002," etc.). In some embodiments, the sequence number may be a randomly generated sequence of numbers associated with the specific telemetry-enriched packet. The timing information may be a string of data corresponding to temporal data associated with the generation or transmission of the telemetry-enriched packet. For example, the timing information may include the time that the telemetry-enriched packet was generated or the time that the telemetry-enriched packet was scheduled for transmission to the destination network device. In other embodiments, the timing information may include temporal data associated with the generation or transmission of the corresponding packet. For example, the timing information may include the time that the packet was generated by the virtualized computing environment or transmitted from the virtualized computing environment to the corresponding network device.

The telemetry-enriched packet may further include an IP information layer 206. The IP information layer 206 may be added during the generation of the packet by the source virtualized computing environment. The IP information layer 206 may correspond to original IP information associated with the base packet of the telemetry-enriched packet. For example, prior to encapsulation, the packet may be generated by a source virtualized computing environment to be delivered to a destination virtualized computing environment and the IP information layer 206 may include a source IP address corresponding to the source virtualized computing environment and a destination IP address corresponding to the destination virtualized computing environment. The IP information layer 206 may be used to determine customers, virtualized computing environments, nodes, etc. associated with a given packet. The information layer 206 may further be used to determine what network traffic corresponds to the telemetry-enriched packet.

The telemetry-enriched packet may further include a TCP information layer 208. The TCP information layer 208 may be added during generation of the packet by the source virtualized computing environment. The TCP information layer 208 may correspond to TCP information associated with the base packet of the telemetry-enriched packet. The TCP information layer 208 may include one or more fields of TCP information. In the example of FIG. 2, the TCP information layer 208 includes a source port, a destination port, and one or more flags. In some embodiments, the TCP information layer 208 may include more or less fields including a sequence number, an acknowledgement number, a data offset, a checksum, or any other fields or pointers. The source port of the TCP information layer 208 may be used to indicate a source port of the source virtualized computing environment. For example, the packet may be transmitted from the source port of the source virtualized computing environment to the source network device based on the TCP information layer 208. The destination port of the TCP information layer 208 may be used to indicate a destination port of the destination virtualized computing environment. For example, the packet may be scheduled to be delivered to the destination port of the destination virtualized computing environment based on the TCP information layer 208. The one or more flags of the TCP information layer 208 may correspond to one or more control bits of the TCP information layer 208. The TCP information layer 208 may include multiple flags and a logical high (e.g. a "1") may indicate that the corresponding flag has been set while a logical low (e.g., a "0") may indicate that the corresponding flag has not been set. The flags may correspond to previously known flags corresponding to TCP information. In the example of FIG. 2, the acknowledgement flag and the push flag have been set in the TCP information layer 208 providing one or more indications to receiving device such as the destination virtualized computing environment. Each flag may have a meaning associated with the flag as determined by the source virtualized computing environment and/or the destination virtualized computing environment. The information layer 206 and the TCP information layer 208 may include flow information included in the packet response. In other embodiments, the flow information may include information from other layers of the packet or information not included in the packet.

The telemetry-enriched packet may also include a payload information layer 210. The payload information layer 210 may be added during generation of the packet by the source virtualized computing environment. The payload information layer 210 may correspond to user data to be sent from the source virtualized computing environment to the destination virtualized computing environment. For example, the payload information layer 210 may correspond to user communications, user commands, or other user data. The payload information layer 210 may be generated by one or more applications associated with the source virtualized computing environment. In some embodiments, the size of the payload information layer 210 may be limited by various network protocols. For example, the size of the payload information layer 210 may be limited to a discrete number of bytes.

Figure 3:
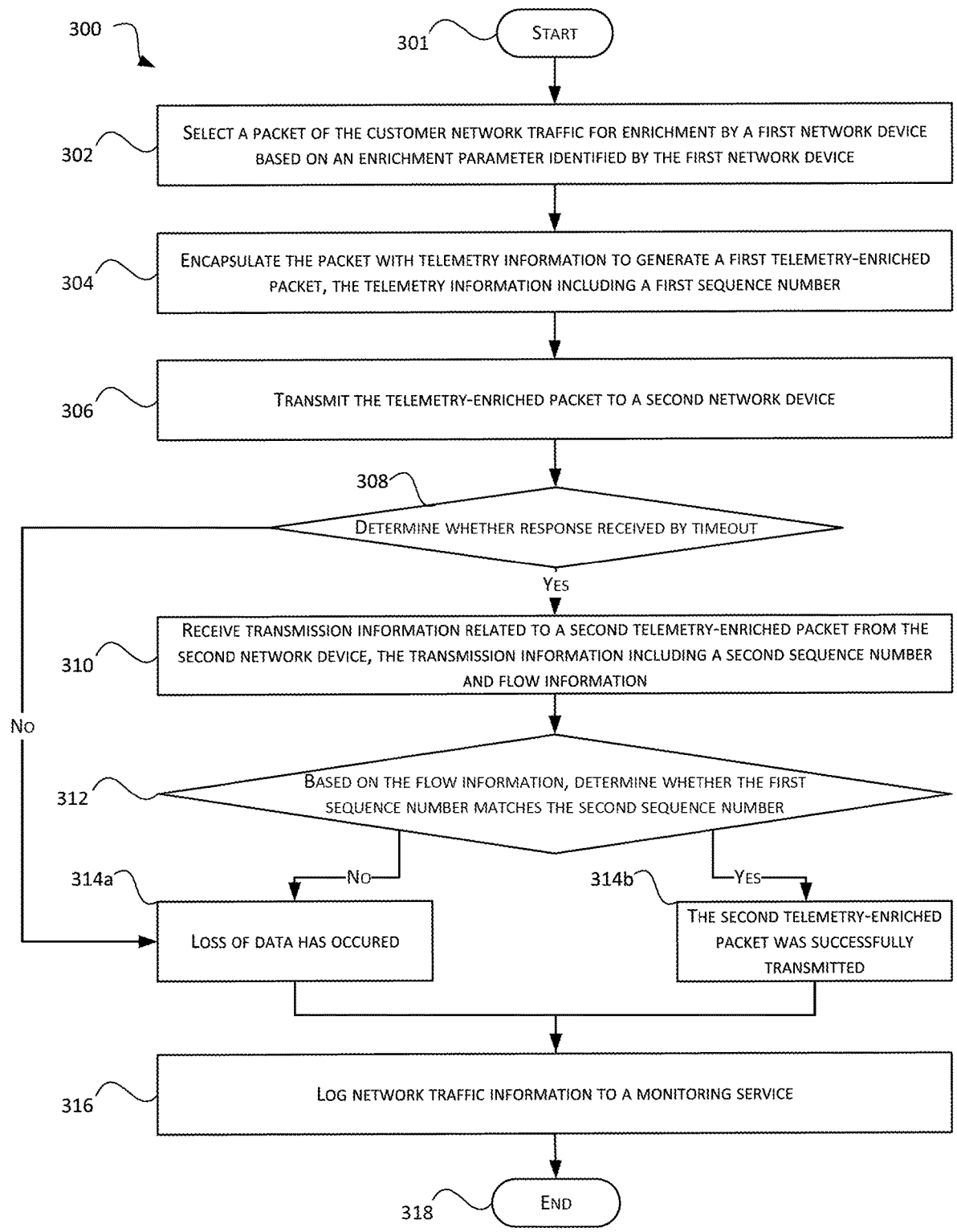
FIG. 3 is a flowchart of an example routine for generating a telemetry-enriched packet according to some embodiments.

FIG. 3 describes an illustrative process 300 for enriching packets of network traffic with telemetry information and determining network traffic statistics based on the response to the enriched packets. The process 300 includes obtaining a response to the telemetry-enriched packet from a destination network device. By using such a destination network device, the source network device can determine network traffic statistics associated with active network traffic between a source virtualized computing environment and a destination virtualized computing environment. Further, the source network device can more accurately determine network traffic statistics as each telemetry-enriched packet generated by the source network device should cause a corresponding response to be sent to the source network device.

The process 300 begins at block 301. The process 300 may begin automatically upon initiation of a connection between a first virtualized computing environment and a second virtualized computing environment. The connection between the first virtualized computing environment and the second virtualized computing environment may correspond to a flow of network traffic. The first virtualized computing environment may correspond to multiple flows of network traffic with multiple other virtualized computing environments. In some embodiments, the process 300 may begin each time that the first virtualized computing environment generates a packet. For example, the process 300 may initiate each time that the first virtualized computing environment generates a packet to be delivered to a second virtualized computing environment. The process 300 may be embodied in a set of executable program instructions stored on a computer-readable medium, such as one or more disk drives, of a computing system of the hypervisor. When the process 300 is initiated, the executable program instructions can be loaded into memory, such as RAM, an executed by one or more processors of the computing system. At block 302, upon initiation of network traffic by the first virtualized computing environment (i.e., generation of a packet), a first network device may monitor the network traffic generated by the first virtualized computing environment. The first network device, as discussed above, may encapsulate each packet of the network traffic prior to sending the packets over the network. The encapsulated packets may include flow information indicating a source IP address, a destination IP address, a source TCP port, a destination TCP port, or other information associated with the flow of network traffic. The first network device may further enrich one or more of the encapsulated packets with telemetry information. In order to enrich the encapsulated packets, the first network device may further obtain or identify corresponding enrichment parameters. In some embodiments, the enrichment parameters may be provided by a user or customer. In other embodiments, the enrichment parameters may be provided by a component of the system such as first virtualized computing environment, the first network device, the first network interface controller, the first hypervisor, or corresponding components at the second. The enrichment parameters may include one or more parameters indicating a number or rate of packets that should be enriched by the first network device. For example, the enrichment parameters may indicate that every third packet of the network traffic should be enriched with the telemetry information. Based on the enrichment parameters, the first network device may select ("intercept") a packet of the network traffic for enrichment.

At block 304, the first network device may encapsulate the selected packet with telemetry information to generate a first telemetry-enriched packet. The telemetry information may include one or more of a sequence number, timing information, and telemetry flags. The first network device may encapsulate the selected packet with encapsulation information. Each packet of the network traffic may receive the same or corresponding encapsulation information. For example, each packet of the network traffic may be encapsulated with data including the IP addresses of the first network device and the second network device. The selected packet may also be encapsulated with telemetry information. The encapsulation information and the telemetry information may correspond to separate or distinct layers of an encapsulation header of the telemetry-enriched packet. The first telemetry-enriched packet may retain a payload and other data separate from the encapsulation header. For example, the encapsulation of the packet and corresponding enrichment may not affect the payload of the packet.

At block 306, the first network device may transmit the first telemetry-enriched packet to a second network device in communication with a second virtualized computing environment. The first telemetry-enriched packet may be transmitted over a network. The first virtualized computing environment may be aware that the first telemetry-enriched packet has been transmitted to the second network device and/or the second virtualized computing environment. However, the first virtualized computing environment may be unaware that the first telemetry-enriched packet has been enriched with telemetry information. While the first virtualized computing environment may recognize that the packet has or will be encapsulated, the first virtualized computing environment may be unable to recognize that the packet has been or will be enriched with telemetry information. Further, the first network device may enrich the packet with telemetry information without input, command, or other recommendation from the first virtualized computing environment.

At block 308, the first network device may determine whether a response is received from the second network device within a timeout period based at least in part on transmitting the telemetry-enriched packet to the second network device. The timeout period may be based at least in part on a previous round-trip time, previous local round-trip time, or any other time period. For example, the timeout period may be a set or user-configurable time period. Further, the time period may be a variation of the round-trip time such as double the round-trip time. The timeout period may further be based on additional timing information as determined by the first network device. If the first network device does not receive a response within the timeout period, the process may proceed to block 316a. If the first network device does receive a response within the timeout period, the process may proceed to block 310.

At block 310, and at some point after the first telemetry-enriched packet (and perhaps other telemetry-enriched packets) has been transmitted by the first network device, the first network device may receive a response including transmission information related to a second telemetry-enriched packet and including a second sequence number. The second telemetry-enriched packet may correspond to the first telemetry-enriched packet. For example, the first network device may receive transmission information related to the second telemetry-enriched packet and determine that the first telemetry-enriched packet was successfully delivered based on the transmission information. However, in some cases, the second telemetry-enriched packet and the first telemetry-enriched packet may be different packets. The transmission information may be a packet of data, a telemetry-enriched packet, or any other type or grouping of data and the first network device may be configured to parse the data in order to determine the transmission information. In such cases, the transmission information related to the second telemetry-enriched packet to the telemetry information of the first telemetry-enriched packet may indicate that the first telemetry-enriched packet was dropped in route to or by the second network device.

At block 312, the first network device may determine whether the first sequence number associated with the telemetry information corresponds to the second sequence number associated with the transmission information. The first network device may determine whether the sequence numbers correspond by comparing flow information associated with each sequence number. In some embodiments, the first network device may determine whether flow information associated with the telemetry information corresponds to flow information associated with the transmission information by comparing sequence numbers associated with each. In some embodiments, the first network device determines that the first sequence number correlates to the second sequence number because they are the same number. In some embodiments, the first network device determines that the first sequence number correlates to the second sequence number because the second sequence number is a logical increment or a logical decrement of the first sequence number, or because the second sequence number has some other type of mathematical relationship with the first sequence number. In yet other embodiments, the first network device determines that the first sequence number correlates to the second sequence number because of some other previously determined relationship between the first sequence number and the second sequence number. For example, the network device may access a table indicating that one sequence number (e.g., 123414) corresponds to another sequence number (e.g., 135654). In some embodiments, the first network device may determine whether the second sequence number corresponds to a plurality of sequence numbers such as sequence numbers stored in a data store.

At block 314a, if the first network device determines that the first sequence number does not correspond to the second sequence number, the first network device may determine that a loss of data has occurred with respect to the second telemetry-enriched packet. For example, based on the sequence numbers not corresponding, the first network device may determine that the packet response corresponds to a different packet or that data was otherwise lost in transmission of the second telemetry-enriched packet. Further, the first network device may determine that the second sequence number does not match a sequence number previously stored by the first network device such as a sequence number associated with a third telemetry-enriched packet. For example, the first network device may generate a third telemetry-enriched packet and receive a response to the third telemetry-enriched packet before receiving the response corresponding to the second telemetry-enriched packet. Based on comparing the sequence numbers, the first network device may further determine that the packet was dropped by the second network device. At block 314b, if the first network device determines that the first sequence number corresponds to the second sequence number, the first network device may determine that the first telemetry-enriched packet and/or the second telemetry-enriched packet was successfully transmitted to the second network device. For example, the first sequence number and the second sequence number may match, be logical increments or decrements, or otherwise correspond. The first network device may subsequently log an indication that the corresponding packet was successfully transmitted as network traffic information.

At block 316, the first network device may log network traffic information to a monitoring service configured to store information associated with the network traffic. The network traffic information may include the transmission information, data loss information, data dropped information, and/or or successful transmission information. The first network device may log the network traffic information with additional information associated with the second telemetry-enriched packet. The first network device may further determine a round-trip time based on the transmission information and log the round-trip time to the monitoring service. The process 300 may end at block 318. The process 300 may further be repeated every time a packet is generated by the first virtual machine or may run continuously. In some embodiments, the process 300 may be repeated every time a first packet is generated for network traffic between a source virtual machine and a destination virtual machine.

Figure 4:
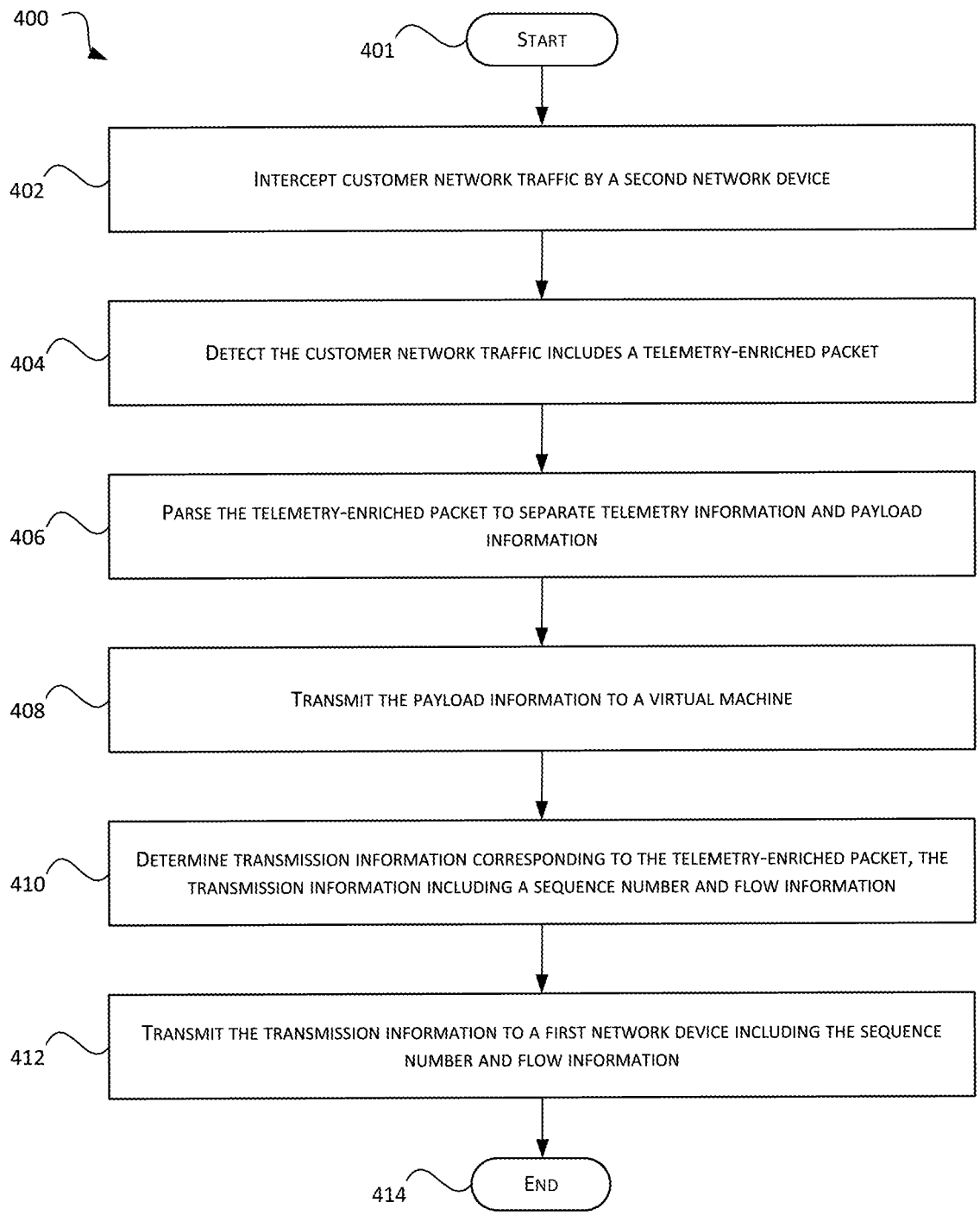
FIG. 4 is a flowchart of an example routine for receiving and responding to a telemetry-enriched packet according to some embodiments.

FIG. 4 describes an illustrative process 400 for receiving telemetry-enriched packets of network traffic and transmitting a response to the source network device and the payload to the destination virtual machine. The process 400 includes obtaining a telemetry-enriched packet from a source network device as previously discussed. By using such a source network device, the destination network device can receive the telemetry-enriched packet and determine transmission information associated with the telemetry-enriched packet. Further, the destination network device can provide the transmission information to the source network device such that the source network device can more accurately determine network traffic statistics.

The process 400 begins at block 401. The process 400 may begin automatically upon initiation of a connection between a first virtual machine and a second virtual machine. In some embodiments, the process 400 may begin each time that the second virtual machine receives a packet from a virtual machine such as the first virtual machine. For example, the process 400 may initiate each time that the second virtual machine receives a packet from the second virtual machine. The process 400 may be embodied in a set of executable program instructions stored on a computer-readable medium, such as one or more disk drives, of a computing system of the hypervisor. When the process 400 is initiated, the executable program instructions can be loaded into memory, such as RAM, an executed by one or more processors of the computing system.

At block 402, upon receipt of network traffic by the second network device, the second network device may intercept a packet of the network traffic. The second network device may intercept, receive, or otherwise obtain a packet of the network traffic in order to decapsulate the packet of network traffic. For example, the second network device may be configured as an IP address destination of the packet based on the encapsulation process. The second network device may further intercept each encapsulated packet of the network traffic and perform a decapsulation process on each encapsulated packet.

At block 404, upon receiving or intercepting packets of the network traffic, the second network device may detect that a packet of the network traffic is a telemetry-enriched packet. For example, the second network device may determine that one packet has been enriched with telemetry information. The second network device may determine a packet is a telemetry-enriched packet based at least in part on a flag, identifier, or header included in the telemetry-enriched packet. For example, the telemetry-enriched packet may include a telemetry flag indicating that the telemetry-enriched packet has been enriched with telemetry information. In some embodiments, the second network device may be provided, obtain, or otherwise identify enrichment parameters previously obtained by the first network device and corresponding to the telemetry-enriched packet. In some embodiments, a user or customer may provide the enrichment parameters to the second network device. In other embodiments, the enrichment parameters may be provided by a component of the system. The enrichment parameters may indicate which packets of the network traffic have been enriched with telemetry information. For example, the enrichment parameters may indicate that every fifth packet received has been enriched with telemetry information. Based on the enrichment parameters, the second network device may determine that a given packet of the network traffic has been enriched with telemetry information. In some embodiments, the second network device may determine a packet is a telemetry-enriched packet based on the enrichment parameters and/or analyzing the telemetry-enriched packet.

At block 406, after detecting a telemetry-enriched packet, the second network device may parse the telemetry-enriched packet. Parsing the telemetry-enriched packet may be based at least in part on first detecting that the telemetry-enriched packet has been enriched with telemetry information. The second network device may separate the telemetry information, the flow information, and the payload information in order to provide the requested payload information to a virtual machine and generate a response to the telemetry information. The second network device may extract one or more fields associated with the telemetry information from the telemetry-enriched packet. For example, the second network device may extract a telemetry flag, a sequence number, timing information, or other telemetry related information from the telemetry-enriched packet. In some embodiments, the second network device extracts the telemetry information and/or the payload information from the telemetry-enriched packet. In parsing the telemetry-enriched packet, the second network device may decapsulate the packet of network traffic. In the decapsulation of the network traffic, the second network device may determine the flow information At block 408, the second network device may transmit the payload information to a second virtual machine associated with the destination IP address in order to fulfill the cycle of network traffic based on the flow information. In some embodiments, the second network device may extract or remove the encapsulation headers and/or telemetry information from the telemetry-enriched packet and transmit the resulting packet to the second virtual machine. In other embodiments, the second network device may extract the payload information from the telemetry-enriched packet and transmit the payload information to the second virtual machine.

At block 410, the second network device may determine transmission information corresponding to the telemetry-enriched packet in order to assist the first network device in determining network traffic statistics. The transmission information may include one or more of a sequence number, the flow information, a local round-trip time, or other statistics associated with the transmission of the telemetry-enriched packet. The transmission information may be determined based at least in part on the telemetry information included in the telemetry-enriched packet. The sequence number of the transmission information may be the sequence number of the telemetry information. For example, the second network device may copy the sequence number from the telemetry information to the transmission information. In some embodiments, the second network device may generate a sequence number based on the sequence number of the telemetry information. For example, the sequence number of the transmission information may have a logical, mathematical, or other relationship with the sequence number of the telemetry information. The flow information may include a destination IP address, a source IP address, a source TCP port, a destination TCP port, or other information associated with the flow of network traffic. The local round-trip time of the transmission information may include a time that a probe was received by the virtual machine. The second network device may determine the local round-trip time by sending a probe to the virtual machine that is the original network destination of the telemetry-enriched packet prior to telemetry enrichment in order to determine a local round-trip time from the second network device to the virtual machine.

At block 412, the second network device may transmit transmission information to a first network device associated with the generation of the telemetry-enriched packet in order to assist the first network device in determining network traffic statistics. The transmission information may include one or more of a sequence number, the flow information, timing information (e.g., local round-trip time), or other transmission information. The transmission information may be sent separately from customer traffic. In some embodiments, the transmission information may be included as payload information in a response by the second network device. In other embodiments, the transmission information may be included in other fields of a packet. For example, the transmission information may be encapsulated into an encapsulation header of the response. In other embodiments, the transmission information may be included in a telemetry-enriched packet. In some embodiments, the second network device may log the transmission information to a corresponding host server. The second network device and the first network device may log information to the same host server. In some embodiments, the second network device may log transmission information to a second host server and the first network device may log network traffic information to a first host server. The second network device and/or the first network device may further calculate network traffic statistics based at least in part on the transmission information. The network traffic statistics may be based on a log that each network device maintains. The first network device and/or the second network device may provide the network traffic statistics to a component such as the host server for display via a user interface. One or more of the network device and the virtualized computing environment may receive customer instructions detailing a manner, method, or other instructions for producing the network traffic statistics. The process 400 may end at block 414. The process 400 may further be repeated every time a packet is received by the second network device or may run continuously.

Figure 5:
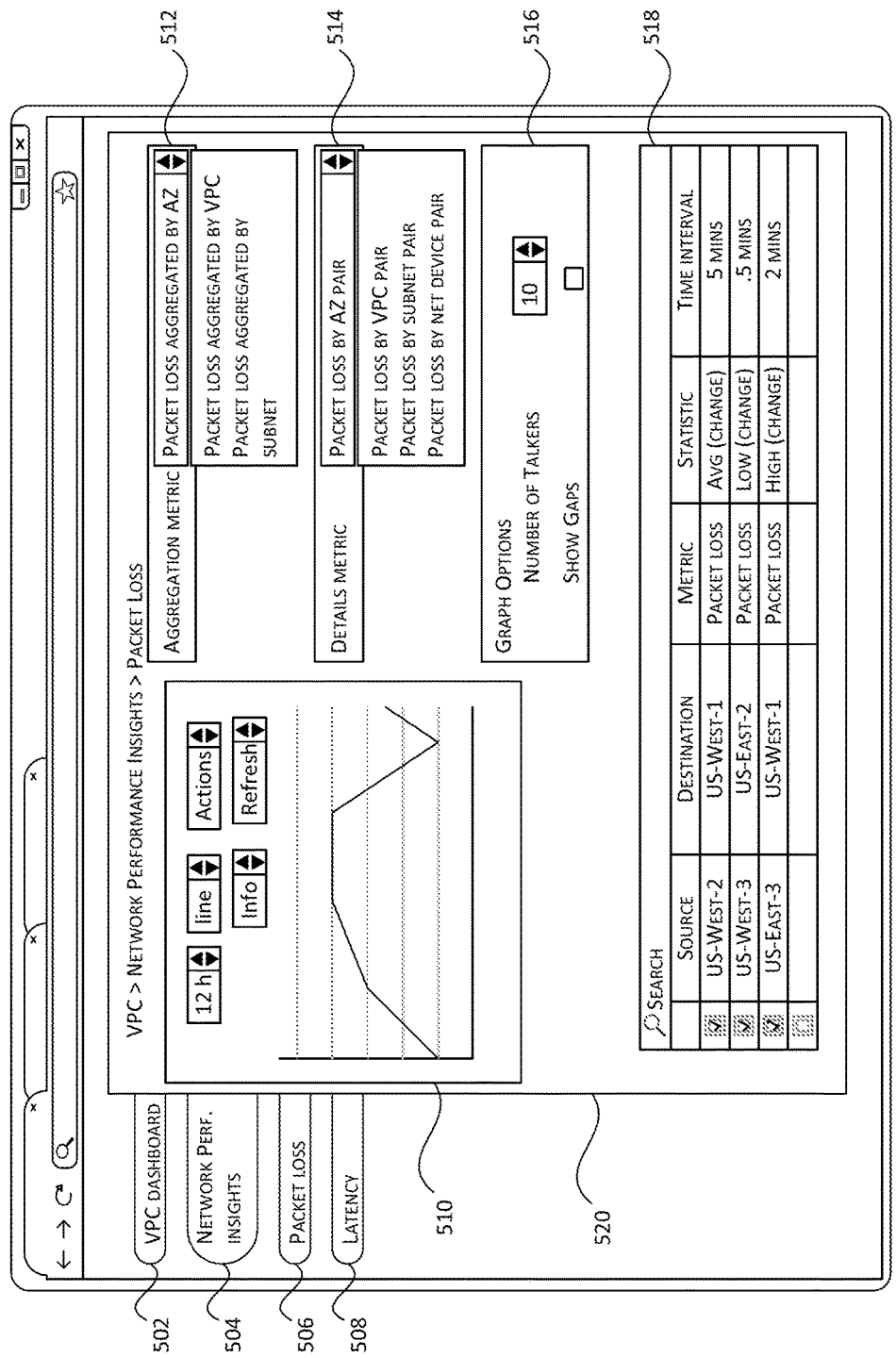
FIG. 5 depicts an example user interface that allows a user to manage packet loss and latency associated with one or more network locations.

FIG. 5 depicts an example client interface 500 for managing active customer network traffic generated by a first virtual machine configured in a virtual private cloud ("VPC") and displaying network traffic statistics based on the active customer network traffic and one or more customer instructions. The client interface 500 may enable the customers whose virtual machines are sending or receiving network traffic to monitor the network traffic and observe network traffic statistics associated with the current performance of the network traffic. The network traffic statistics may map packets being sent by the virtual machine and track success rates of the packet transmission. Specifically, the network traffic statistics may include the number of packets that were lost, dropped, successfully transmitted, etc. Based on the network traffic statistics, the customer may alter or change the network traffic. For example, the customer may stop sending network traffic to a node based on network traffic statistics associated with the given node.

In some embodiments, the client interface 500 is used to identify network traffic statistics according to a hierarchy of network sources. For example, the client interface 500 may identify network traffic statistics between from a regional level to a network level (e.g., availability zones, to virtual private clouds to subnetworks to network devices). The comparison of multiple levels of sources may allow a customer to see network traffic statistics on a very broad scale and inspect specific pieces of the network. For example, the customer may determine that virtual private cloud is associated with higher packet loss and the customer may be able to narrow the source of the packet loss down to a specific network device. The customer may be allowed to interact with the client interface 500 in order to modify the network traffic statistics being reported by the client interface 500. The customer may further be able to generate a visual representation of the network traffic statistic in order to provide greater insight into the network traffic statistics.

The client interface 500 may include a plurality of interfaces 502, 504, 506, and 508. The client interface 500 may include a VPC dashboard 502. The VPC dashboard 502 may be used to provide a customer with access to information about a customer's VPC. The VPC dashboard 502 may further allow the customer to modify the VPC. For example, the customer may be able to affect how the VPC is configured through the VPC dashboard 502 by changing various VPC parameters. The VPC dashboard 502 may further provide statistical analysis of the VPC. A statistical analysis of the VPC may be found in the network performance insights 504. The network performance insights 504 may be a button or field in the VPC dashboard 504. The network performance insights 504 may further provide a compilation of statistics associated with the VPC. The network performance insights 504 may further include a packet loss 506 page or field and packet latency 508 page or field. The packet loss 506 may provide a compilation of data loss statistics for a given customer. The data loss statistics may be provided by one or more network devices based at least in part on one or more telemetry-enriched packets. The packet latency 508 may provide a compilation of data latency statistics for a given customer. The data latency statistics may be provided by one or more network devices based at least in part on trip times (e.g., a local round-trip time, a round trip time) with respect to telemetry-enriched packets. By interacting with the packet loss 506 field or the packet latency 508 field, a corresponding page may be opened in the client interface 500. In the example of FIG. 5, the client interface 500 corresponds to the packet loss page 520. It will be understood that the client interface 500 may show a similar page for the packet latency page and any of the features disclosed below may be implemented with respect to a packet latency page. It will also be understood that the client interface 500 may include any number of pages or fields. The client interface 500 may allow client interactions that may focus the data of the client interface 500 from a national level to a regional level. For example, the client interface may include a plurality of buttons, pages, or tabs that allow the client to zoom in the data to a more regional level and/or zoom out the data to a more national level.

The packet loss page 520 may further include a graph 510. The graph 510 may plot network traffic statistics with respect to one or more other fields. For example, the graph 510 may map packet loss with respect to time. The graph 510 may include a plurality of buttons to modify the graph field and the data represented by the graph 510 (e.g., the relevant the time period, the type of line, the level of information provided). Further, the graph 510 may include a plurality of buttons that execute one or more actions with respect to the graph 510 (e.g., a refresh button, a zoom button). The packet loss page 520 may further include graph options 516 to further adjust the data represented by the graph 510. The graph options 516 may include a plurality of adjustable options with respect to the graph 510. In the example of FIG. 5, the graph options 516 include a number of talkers options and a show gaps option. The number of talkers options may allow the customer to adjust the number of talkers shown in the graph 510 and the show gaps options may allow the customer to adjust gaps shown by the graph 510.

The packet loss page 520 may also include an aggregation metric 512. The aggregation metric 512 may allow the customer to adjust the level of aggregation for the packet loss statistics disclosed in the packet loss page 520. For example, the customer may be able to aggregate packet loss by availability zone, VPC, or subnet. The packet loss page 520 may further include a details metric 514. The details metric 514 may allow the customer to adjust the level of detail for the packet loss statistics disclosed in the packet loss page 520. For example, the customer may be able to adjust the level of detail shown by availability zone pair, VPC pair, subnet pair, or network device pair. It will be understood that the aggregation metric 512 and the details metric 514 may include more or less levels of granularity in different implementations.

The packet loss page 520 may further include a network interface 518 for representing the current network traffic being generated or received by the customer. The network interface 518 may include the sources and destinations of the current network traffic of the customer. Illustratively, the network interface 518 includes three sets of network traffic; however, the network interface 518 may include any number of sets of network traffic. The sources and destinations may be represented by availability zones, VPCs, subnets, or network devices and the level of granularity with respect to the sources and destinations may be adjusted by the aggregation metric 512 and/or the details metric 514. In some embodiments, the sources and destinations may include a higher or lower level of granularity. The customer may be able to adjust the sources and corresponding destinations that are illustrated in the graph 510 via an assortment of interactive buttons. The network interface 518 may further include a metrics field indicating how the network traffic statistics are currently being illustrated. For example, the metrics field may indicate that the sources and destinations are being shown with respect to packet loss, packet latency, or other network traffic statistics. The metric fields may correspond to the packet loss 508 or the packet latency 508 selected by the customer. The network interface 518 may further include a statistic field indicating the level of analysis requested by the customer. The customer may be able to modify the statistic field in order to modify how the data is represented and/or measured. In the example of FIG. 5, the first set of network traffic is being monitored according to an average packet loss of the network traffic, the second set of network traffic is being monitored according to a low (e.g., minimum) packet loss of the network traffic, and the third set of network traffic is being monitored according to a high (e.g., maximum) packet loss of the network traffic. The network interface 518 may further include a time interval field indicating the time period at which the network traffic is being monitored. The time interval field may correspond to the time period between generations of telemetry-enriched packets. In the example of FIG. 5, the first set of network traffic transmits a telemetry-enriched packet every five minutes, the second set of network traffic transmits a telemetry-enriched packet every 0.5 minutes, and the third set of network traffic transmits a telemetry-enriched packet every 2 minutes.

FIG. 6 illustrates an example computing system 600 that executes the processes and implement the features described above. In some embodiments, the computing system 600 may include: one or more processing units 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; an input/output device interface 608, such as an IO interface in communication with one or more microphones; and one or more computer readable memories 610, such as random access memory ("RAM") and/or other volatile non-transitory computer-readable media.

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 602 in the general administration and operation of the computing system 600. The computer readable memory 610 can further include computer program instructions and other information for implementing aspects of the present disclosure. For example, in one embodiment, the computer readable memory 610 may include a network traffic parser 614. As another example, the computer-readable memory 610 may include a data store 616. Further, the computer readable memory 610 may include a network traffic enricher 618.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry that processes computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   identifying, by a first network device in communication with a first computing environment, an enrichment parameter for enriching a packet of a plurality of packets of active network traffic being transmitted from the first computing environment to a second computing environment, wherein the enrichment parameter identifies a subset of the plurality of packets for enrichment;
   intercepting, by the first network device from the first computing environment, a first packet of the plurality of packets, wherein the first packet comprises payload information in a format, and wherein the payload information is designated for delivery from the first computing environment to the second computing environment;
   determining, by the first network device, that the first packet corresponds to the subset of the plurality of packets for enrichment based at least in part on the enrichment parameter;
   determining, by the first network device, that a second packet of the plurality of packets does not correspond to the subset of the plurality of packets for enrichment based at least in part on the enrichment parameter;
   encapsulating, by the first network device, telemetry information in the first packet to form a first enriched packet based at least in part on determining that the first packet corresponds to the subset of the plurality of packets for enrichment, wherein:
      the first enriched packet comprises the payload information, the telemetry information, and information identifying that the first enriched packet is a telemetry-enriched packet,
      the payload information retains the format in the first enriched packet,
      the telemetry information includes a first identifier identifying the plurality of packets and a first sequence number, and
      the telemetry information is encapsulated in the first enriched packet separate from the payload information;
   in response to determining that the first packet corresponds to the subset of the plurality of packets for enrichment, transmitting, from the first network device, the first enriched packet to a second network device in communication with the second computing environment instead of the first packet based at least in part on the first identifier identifying the plurality of packets, wherein the second network device extracts the payload information from the first enriched packet and routes the payload information and payload information related to the second packet to the second computing environment;
   receiving, by the first network device, transmission information related to a second enriched packet from the second network device, wherein:
      the second network device determines the first enriched packet comprises the information identifying that the first enriched packet is a telemetry-enriched packet,
      the second network device determines the transmission information based on the telemetry information encapsulated in the first enriched packet,
      in response to determining the first enriched packet comprises the information identifying that the first enriched packet is a telemetry-enriched packet, the second network device transmits the transmission information to the first network device based on the first network device forming the first enriched packet,
      the second network device determines the second packet does not comprise information identifying that the second packet is a telemetry-enriched packet,
      in response to determining the second packet does not comprise information identifying that the second packet is a telemetry-enriched packet, the second network device does not transmit transmission information related to the second packet, and
      the transmission information includes a second sequence number and a second identifier;
   comparing, by the first network device, the transmission information to the telemetry information encapsulated in the first enriched packet; and
   determining, based at least in part on comparing the transmission information to the telemetry information encapsulated in the first enriched packet, a network traffic statistic associated with the plurality of packets.

2. The computer-implemented method of claim 1 further comprising logging, by the first network device, network traffic information to a monitoring service, the network traffic information based at least in part on the network traffic statistic.

3. The computer-implemented method of claim 1, wherein the network traffic statistic indicates that transmitting the first enriched packet to the second network device was successful based at least in part on comparing the transmission information to the telemetry information.

4. The computer-implemented method of claim 1, wherein the second network device:
   intercepted a third packet of the plurality of packets;
   detected the third packet corresponds to the second enriched packet;
   parsed the second enriched packet to identify additional telemetry information and the second identifier, wherein the additional telemetry information from the second enriched packet includes the second sequence number; and
   transmitted the second sequence number and the second identifier as the transmission information to the first network device.

5. A computer-implemented method comprising:
   selecting, by a first network device, a first packet of plurality of packets of active network traffic from a first computing environment to a second computing environment for enrichment based at least in part on an enrichment parameter, wherein the enrichment parameter identifies a subset of the plurality of packets for enrichment, the first packet corresponding to the subset of packets, wherein the first packet comprises payload information in a format, and wherein the payload information is designated for delivery from the first computing environment to the second computing environment;
   determining, by the first network device, that a second packet of the plurality of packets does not correspond to the subset of the plurality of packets for enrichment based at least in part on the enrichment parameter;
   encapsulating, by the first network device, the first packet with telemetry information to form a first enriched packet based at least in part on selecting the first packet for enrichment, wherein:
      the first enriched packet comprises the payload information, the telemetry information, and information identifying that the first enriched packet is a telemetry-enriched packet,
      the payload information retains the format in the first enriched packet, and
      the telemetry information includes a first identifier identifying the plurality of packets and a first sequence number;
   in response to selecting the first packet for enrichment, transmitting, from the first network device, the first enriched packet to a second network device in communication with the second computing environment based at least in part on the first identifier identifying the plurality of packets, wherein the second network device extracts the payload information from the first enriched packet and routes the payload information and payload information related to the second packet to the second computing environment;
   receiving, by the first network device, transmission information related to a second enriched packet from the second network device, wherein:
      the second network device determines the first enriched packet comprises the information identifying that the first enriched packet is a telemetry-enriched packet,
      the second network device determines the transmission information based on the telemetry information encapsulated in the first enriched packet,
      in response to determining the first enriched packet comprises the information identifying that the first enriched packet is a telemetry-enriched packet, the second network device transmits the transmission information to the first network device based on the first network device forming the first enriched packet,
      the second network device determines the second packet does not comprise information identifying that the second packet is a telemetry-enriched packet,
      in response to determining the second packet does not comprise information identifying that the second packet is a telemetry-enriched packet, the second network device does not transmit transmission information related to the second packet, and
      the transmission information includes a second sequence number and a second identifier;
   comparing, by the first network device, the transmission information to the telemetry information encapsulated in the first enriched packet; and
   determining, based at least in part on comparing the transmission information to the telemetry information encapsulated in the first enriched packet, a network traffic statistic associated with the plurality of packets.

6. The computer-implemented method of claim 5, wherein comparing the transmission information to the telemetry information comprises comparing at least the first sequence number to the second sequence number.

7. The computer-implemented method of claim 5, wherein comparing the transmission information to the telemetry information comprises comparing at least the first identifier to the second identifier.

8. The computer-implemented method of claim 5 further comprising:
   determining a round-trip time for the second enriched packet based at least in part on the first network device transmitting the second enriched packet and receiving the transmission information;
   transmitting, from the first network device, a third enriched packet to the second network device, wherein the third enriched packet comprises additional telemetry information including a third identifier identifying the plurality of packets and a third sequence number; and
   determining, based at least in part on comparing the round-trip time to a transmission time of the third enriched packet, that a loss of data has occurred in the plurality of packets.

9. The computer-implemented method of claim 5 further comprising:
   transmitting, from the first network device, a third enriched packet to the second network device, wherein the third enriched packet comprises additional telemetry information including a third sequence number;
   receiving, by the first network device, additional transmission information related to a fourth enriched packet from the second network device, wherein the second network device transmits the additional transmission information to the first network device based on determining the third enriched packet comprises information identifying that the third enriched packet is a telemetry-enriched packet, wherein the additional transmission information includes a fourth identifier and an indication that the second network device dropped the fourth enriched packet, wherein the fourth identifier identifies the plurality of packets; and determining, based at least in part on the additional transmission information, that a loss of data has occurred in the plurality of packets.

10. The computer-implemented method of claim 9 further comprising logging, by the first network device, network traffic information to a monitoring service, wherein the network traffic information indicates that the loss of data has occurred.

11. The computer-implemented method of claim 5, wherein the network traffic statistic indicates that transmitting the first enriched packet to the second network device was successful based at least in part on comparing the transmission information to the telemetry information.

12. The computer-implemented method of claim 5, wherein the network traffic statistic indicates that a loss of data has occurred in the plurality of packets based at least in part on comparing the transmission information to the telemetry information.

13. The computer-implemented method of claim 5, wherein selecting, by the first network device, the first packet for enrichment comprises determining, by the first network device, that the first packet corresponds to the subset of the plurality of packets for enrichment.

14. A network monitoring system comprising:
a first network device associated with a first virtualized computing environment; and
a second network device associated with a second virtualized computing environment,
wherein the first network device is configured to at least:
intercept a first packet of a plurality of packets of active network traffic from the first virtualized computing environment to the second virtualized computing environment for enrichment based at least in part on an enrichment parameter, wherein the enrichment parameter identifies a subset of the plurality of packets for enrichment, the first packet corresponding to the subset of packets, wherein the first packet comprises payload information with a format, and wherein the payload information is designated for delivery from the first virtualized computing environment to the second virtualized computing environment;
determine that a second packet of the plurality of packets-does not correspond to the subset of the plurality of packets for enrichment based at least in part on the enrichment parameter;
encapsulate the first packet with telemetry information to form a first enriched packet based at least in part on intercepting the first packet for enrichment, wherein:
the first enriched packet comprises the payload information, the telemetry information, and information identifying that the first enriched packet is a telemetry-enriched packet,
the payload information retains the format in the first enriched packet, and
the telemetry information includes a first identifier identifying the plurality of packets and a first sequence number;
in response to intercepting the first packet for enrichment, transmit the first enriched packet to the second network device associated with the second virtualized computing environment based at least in part on the first identifier identifying the plurality of packets, wherein the second network device extracts the payload information from the first enriched packet and routes the payload information and payload information related to the second packet to the second virtualized computing environment;
receive transmission information related to a second enriched packet from the second network device, wherein:
the second network device determines the first enriched packet comprises the information identifying that the first enriched packet is a telemetry-enriched packet,
the second network device determines the transmission information based on the telemetry information encapsulated in the first enriched packet,
in response to determining the first enriched packet comprises the information identifying that the first enriched packet is a telemetry-enriched packet, the second network device transmits the transmission information to the first network device based on the first network device forming the first enriched packet,
the second network device determines the second packet does not comprise information identifying that the second packet is a telemetry-enriched packet,
in response to determining the second packet does not comprise information identifying that the second packet is a telemetry-enriched packet, the second network device does not transmit transmission information related to the second packet, and
the transmission information includes a second sequence number and a second identifier;
compare the transmission information to the telemetry information encapsulated in the first enriched packet; and
determine, based at least in part on comparing the transmission information to the telemetry information encapsulated in the first enriched packet, a network traffic statistic associated with the plurality of packets.

15. The network monitoring system of claim 14, wherein the first network device is further configured to at least one of:
compare the transmission information to the telemetry information by comparing the first sequence number to the second sequence number; or
compare the transmission information to the telemetry information by comparing the first identifier to the second identifier.

16. The network monitoring system of claim 14, wherein the network traffic statistic indicates, based at least in part on comparing the transmission information to the telemetry information, that transmitting the first enriched packet to the second network device was successful, or that a loss of data has occurred in the plurality of packets.

17. The network monitoring system of claim 14, wherein the second network device is configured to at least:
intercept a third packet of the plurality of packets;
detect the third packet corresponds to the second enriched packet;
parse the second enriched packet to identify additional telemetry information, the second identifier, and additional payload information from the second enriched packet, wherein the additional telemetry information includes the second sequence number; and
transmit the second sequence number and the second identifier as the transmission information to the first network device.

18. The network monitoring system of claim 14, wherein intercepting, by the first network device, the first packet for enrichment comprises determining, by the first network device, that the first packet should be enriched based at least in part upon the enrichment parameter.

19. The network monitoring system of claim 14, wherein the first network device is further configured to at least:
   intercept the second packet, the second packet being transmitted from the first virtualized computing environment to the second virtualized computing environment;
   determine that the second packet should be encapsulated without enrichment information based at least in part upon determining that the second packet does not correspond to the subset of the plurality of packets for enrichment; and
   transmit the second packet to the second network device.

20. The network monitoring system of claim 14, wherein encapsulating the first packet with telemetry information comprises consulting a mapping directory, and wherein the mapping directory maps an IP address to a substrate IP address.

21. The network monitoring system of claim 14, wherein the first network device is further configured to at least obtain the enrichment parameter from a user computing device, the enrichment parameter identifying at least one of an enrichment rate, an enrichment time period, or an enrichment number for the plurality of packets.

22. The network monitoring system of claim 14, wherein the first network device is further configured to at least determine the enrichment parameter based on at least one of enrichment data or a second network traffic statistic.

23. The network monitoring system of claim 14, wherein the second network device is further configured to:
   obtain the enrichment parameter; and
   identify the second packet based at least in part on the enrichment parameter, wherein the second network device is further configured to at least transmit the transmission information to the first network device in response to identifying the second packet.

* * * * *